United States Patent
Im et al.

(10) Patent No.: US 12,509,038 B2
(45) Date of Patent: Dec. 30, 2025

(54) ELECTRONIC STABILITY CONTROL SYSTEM AND METHOD FOR VEHICLE

(71) Applicants: CARCBM, INC., Seoul (KR); Korea Automotive Technology Institute, Cheonan-si (KR)

(72) Inventors: Jun Sik Im, Seoul (KR); Jin Yong Kim, Cheonan-si (KR); Jong Soon Im, Seoul (KR)

(73) Assignees: CARCBM, INC, Seoul (KR); KOREA AUTOMOTIVE TECHNOLOGY INSTITUTE, Cheonan-si (KR)

( * ) Notice: Subject to any disclaimer, the term of this patent is extended or adjusted under 35 U.S.C. 154(b) by 29 days.

(21) Appl. No.: 18/765,630

(22) Filed: Jul. 8, 2024

(65) Prior Publication Data

US 2025/0162551 A1   May 22, 2025

(30) Foreign Application Priority Data

Nov. 21, 2023   (KR) ........................ 10-2023-0161841

(51) Int. Cl.
*B60T 8/171*      (2006.01)
*B60T 8/172*      (2006.01)
*B60T 8/1755*     (2006.01)

(52) U.S. Cl.
CPC .......... *B60T 8/17552* (2013.01); *B60T 8/171* (2013.01); *B60T 8/172* (2013.01); *B60T 8/17551* (2013.01);
(Continued)

(58) Field of Classification Search
CPC ...... B60T 8/17552; B60T 8/171; B60T 8/172; B60T 8/17551; B60T 2230/02; B60T 2240/00
See application file for complete search history.

(56) References Cited

U.S. PATENT DOCUMENTS

| | | | |
|---|---|---|---|
| 6,070,952 A * | 6/2000 | Tozu ..................... | B60T 8/1755 303/146 |
| 6,904,351 B1 * | 6/2005 | Hac ........................ | B60T 8/172 180/197 |

(Continued)

FOREIGN PATENT DOCUMENTS

| | | |
|---|---|---|
| JP | 2010-203354 | 9/2010 |
| KR | 10-2018-0067121 | 6/2018 |

(Continued)

*Primary Examiner* — Jacob M Amick
(74) *Attorney, Agent, or Firm* — LEX IP MEISTER, PLLC

(57) ABSTRACT

An electronic stability control system for a vehicle is disclosed. The electronic stability control system for a vehicle may include: first, second, third, and fourth acceleration sensors mounted on each wheel of the vehicle to detect the lateral acceleration and vertical acceleration of the corresponding wheel; a controller configured to be connected to first, second, third, and fourth acceleration sensors and receives lateral accelerations and vertical accelerations of the four wheels, calculate maximum values of lateral accelerations of front and rear wheels and lateral tire stiffness of the front and rear wheels considering load movement based on the lateral accelerations and vertical accelerations of the four wheels, calculate side slip angles of the front and rear wheels and a difference between the side slip angles of the front and rear wheels based on maximum values of lateral angular velocities of the front and rear wheels and the lateral tire stiffness of the front and rear wheels considering load movement, and determine brake pressure and a target wheel to which the brake pressure is to be applied in response to the difference between the side slip angles of the front and rear wheels exceeding a set value; and an actuator configured to receive a control signal from the controller and apply the brake pressure to the target wheel. An electronic stability (Continued)

control method for a vehicle using the electronic stability control system is further disclosed.

12 Claims, 7 Drawing Sheets

(52) U.S. Cl.
CPC ....... *B60T 2230/02* (2013.01); *B60T 2240/00* (2013.01)

(56) References Cited

U.S. PATENT DOCUMENTS

| | | | |
|---|---|---|---|
| 2008/0109133 A1* | 5/2008 | Bedner | B62D 6/003 701/41 |
| 2012/0053791 A1* | 3/2012 | Harada | B60T 8/4031 701/38 |
| 2013/0245889 A1* | 9/2013 | Kikuchi | B60T 8/17555 701/38 |
| 2016/0159225 A1* | 6/2016 | Nakatsu | B60L 15/2009 701/70 |
| 2022/0185249 A1 | 6/2022 | Nakagawa | |
| 2023/0347875 A1 | 11/2023 | Montalbano et al. | |

FOREIGN PATENT DOCUMENTS

| | | |
|---|---|---|
| KR | 10-2022-0043983 | 4/2022 |
| KR | 10-2023-0153880 | 11/2023 |

* cited by examiner

ELECTRONIC STABILITY CONTROL SYSTEM AND METHOD FOR VEHICLE

CROSS-REFERENCE TO RELATED APPLICATION

This application claims priority to and the benefit of Korean Patent Application No. 10-2023-0161841 filed in the Korean Intellectual Property Office on Nov. 21, 2023, the entire contents of which are incorporated herein by reference.

BACKGROUND OF THE INVENTION

(a) Field of the Invention

The present disclosure relates to an electronic stability control system and method for a vehicle, and more particularly, to an electronic stability control system and method for a vehicle that provides improved control performance through faster and more accurate detection of the electronic stability of the vehicle by controlling the electronic stability of the vehicle using cornering rigidity considering maximum values of lateral accelerations of front and rear wheels and load movement.

(b) Description of the Related Art

Conventionally, a technology was proposed to control electronic stability of a vehicle using a lateral load measured by a wheel load sensor. However, wheel load sensors are so expensive that they can be used for testing at a laboratory level, but have difficulty being applied to actual vehicles and put into practical use.

Another conventional technology has been proposed to control electronic stability of a vehicle by measuring wheel lateral acceleration, wheel speed, yaw rate, and a steering angle. According to this technology, by using an average value of lateral acceleration of front and rear wheels, it was determined that the vehicle is likely to slip left and right.

In order to improve vehicle driving stability and reduce accidents caused by lane departure, there is a need to detect electronic stability of a vehicle faster and more accurately.

The above information disclosed in this Background Art is only for enhancement of understanding of the background of the present disclosure and therefore it may contain information that does not form the prior art that is already known in this country to a person of ordinary skill in the art.

SUMMARY OF THE INVENTION

The present disclosure attempts to provide an electronic stability control system and method for a vehicle that provides improved control performance through faster and more accurate detection of the electronic stability of the vehicle by controlling the electronic stability of the vehicle using cornering rigidity considering maximum values of lateral accelerations of front and rear wheels and load movement.

According to an embodiment of the present disclosure, an electronic stability control system for a vehicle may include: first, second, third, and fourth acceleration sensors, each being mounted on each wheel of the vehicle to detect lateral acceleration and vertical acceleration of the corresponding wheel; a controller configured to be connected to the first, second, third, and fourth acceleration sensors to receive the lateral accelerations and the vertical accelerations of the four wheels, calculate maximum values of lateral accelerations of front and rear wheels and lateral tire stiffnesses of the front and rear wheels considering load movement based on the lateral accelerations and the vertical accelerations of the four wheels, calculate side slip angles of the front and rear wheels and a difference between the side slip angles of the front and rear wheels based on the maximum values of the lateral angular velocities of the front and rear wheels and the lateral tire stiffnesses of the front and rear wheels considering the load movement, and determine brake pressure and a target wheel to which the brake pressure is to be applied in response to the difference between the side slip angles of the front and rear wheels exceeding a set value; and an actuator configured to receive a control signal from the controller and apply the brake pressure to the target wheel.

The lateral tire stiffnesses ($K_{fm}$, $K_{rm}$) of the front and rear wheels considering the load movement may be calculated from $$K_{f_m} = \frac{K_f}{|A_{zfl} - A_{zfr}|}, K_{r_m} = \frac{K_r}{|A_{zrl} - A_{zrr}|},$$

and $K_f$ and $K_r$ may be the lateral tire stiffnesses of the front and rear wheels, $A_{zfl}$ and $A_{zfr}$ may be the vertical accelerations of the left and right front wheels, and $A_{zrl}$ and $A_{zrr}$ may be the vertical accelerations of the left and right rear wheels.

The side slip angles of the front and rear wheels ($\beta_f$ and $\beta_r$) may be calculated from $$\beta_f = \frac{A_{yf\_max} m_f}{K_{f_m}}, \beta_r = \frac{A_{yr\_max} m_r}{K_{r_m}},$$

and $m_f$ may be a mass of the front wheel, and $m_r$ may be a mass of the rear wheel.

The target wheel may be determined according to a sign of a value obtained by subtracting the rear wheel side slip angle from the front wheel side slip angle.

When the value obtained by subtracting the rear wheel side slip angle from the front wheel side slip angle is positive (+), the target wheel may be inner front and rear wheels when driving on a curve, and when the value obtained by subtracting the rear wheel side slip angle from the front wheel side slip angle is negative (−), the target wheel may be outer front and rear wheels when driving on the curve.

The target pressure may be calculated by multiplying the difference between the front and rear wheel side slip angles by a preset gain.

According to another embodiment of the present disclosure, an electronic stability control method for a vehicle may include: detecting lateral accelerations and vertical accelerations of four wheels; calculating maximum values of lateral accelerations of the front and rear wheels and lateral tire stiffnesses of the front and rear wheels considering load movement based on the lateral accelerations and the vertical accelerations of the four wheels; calculating side slip angles of the front and rear wheels and a difference between the side slip angles of the front and rear wheels based on the maximum values of the lateral angular velocities of the front and rear wheels and the lateral tire stiffnesses of the front and rear wheels considering the load movement; determining brake pressure and a target wheel to which the brake pressure is to be applied in response to the difference between the side slip angles of the front and rear wheels exceeding a set value; and generating the brake pressure and applying the brake pressure to the target wheel.

The lateral tire stiffnesses ($K_{fm}$, $K_{rm}$) of the front and rear wheels considering the load movement may be calculated from $$K_{fm} = \frac{K_f}{|A_{zfl} - A_{zfr}|}, K_{rm} = \frac{K_r}{|A_{zrl} - A_{zrr}|},$$

and $K_f$ and $K_r$ may be the lateral tire stiffnesses of the front and rear wheels, $A_{zfl}$ and $A_{zfr}$ may be the vertical accelerations of the left and right front wheels, and $A_{zrl}$ and $A_{zrr}$ may be the vertical accelerations of the left and right rear wheels.

The side slip angles of the front and rear wheels ($\beta_f$, $\beta_r$) may be calculated from $$\beta_f = \frac{A_{yf\_max} m_f}{K_{fm}}, \beta_r = \frac{A_{yr\_max} m_r}{K_{rm}},$$

and $m_f$ may be a mass of the front wheel, and $m_r$ may be a mass of the rear wheel.

The target wheel may be determined according to a sign of a value obtained by subtracting the rear wheel side slip angle from the front wheel side slip angle.

When the value obtained by subtracting the rear wheel side slip angle from the front wheel side slip angle is positive (+), the target wheel may be inner front and rear wheels when driving on a curve, and when the value obtained by subtracting the rear wheel side slip angle from the front wheel side slip angle is negative (−), the target wheel may be outer front and rear wheels when driving on the curve.

The target pressure may be calculated by multiplying the difference between the front and rear wheel side slip angles by a preset gain.

According to the present disclosure, it is possible to achieve the electronic stability control more quickly in situations where the lateral slippage may occur. As a result, it is possible to drive the vehicle more safely without deviating from the lane.

Other effects that may be obtained or are predicted by an exemplary embodiment will be explicitly or implicitly described in a detailed description of an exemplary embodiment. That is, various effects that are predicted according to an exemplary embodiment will be described in the following detailed description.

BRIEF DESCRIPTION OF THE DRAWINGS

Embodiments of the present specification may be better understood by referring to the following description in conjunction with the accompanying drawings, where like reference numerals refer to identical or functionally similar elements.

Figure 1:
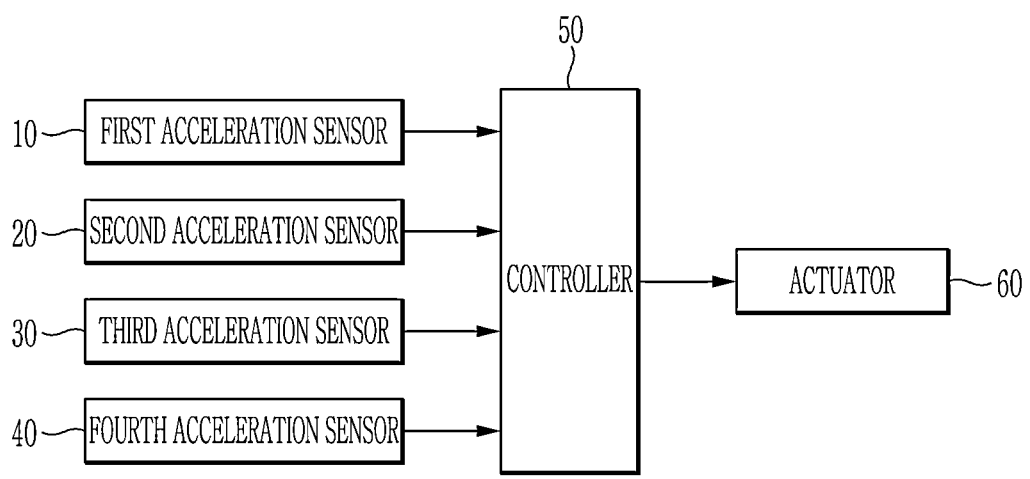
FIG. 1 is a block diagram of an electronic stability control system for a vehicle according to an embodiment of the present disclosure.

It should be understood that the drawings referenced above are not necessarily drawn to scale, and present rather simplified representations of various preferred features illustrating the basic principles of the present disclosure. For example, specific design features of the present disclosure, including specific dimensions, direction, position, and shape, will be determined in part by specific intended applications and use environments.

DETAILED DESCRIPTION OF THE EMBODIMENTS

The terminology used herein is for the purpose of describing particular embodiments only, and is not intended to limit the present disclosure. As used herein, singular forms are intended to also include plural forms, unless the context clearly dictates otherwise. The terms "includes" and/or "including," specify the cited features, integers, steps, operations, elements, and/or the presence of components when used herein, but it will also be understood that these terms do not exclude the presence or addition of one or more of other features, integers, steps, operations, elements, components, and/or groups thereof. As used herein, the term "and/or" includes any one or all combinations of the associated listed items.

As used herein, "vehicle" or "of vehicle" or other similar terms include general land vehicles, including passenger cars including sport utility vehicles (SUVs), buses, trucks, various commercial vehicles, and the like. In addition, as used in this specification, "vehicle" or "of vehicle" or other similar terms are understood as including hybrid vehicles, electric vehicles, plug-in hybrid vehicles, hydrogen-powered vehicles, and other alternative fuel (e.g., fuels derived from resources other than petroleum) vehicles. The hybrid vehicles include vehicles with two or more power sources, such as gasoline-powered and electric-powered vehicles. Vehicles according to an embodiment of the present disclosure include vehicles driven somewhat autonomously and/or automatically as well as vehicles driven manually.

Additionally, it is understood that one or more of the methods below or aspects thereof may be executed by at least one or more controllers. The term "controller" may refer to a hardware device including a memory and a processor. The memory is configured to store program instructions, and the processor is specifically programmed to execute the program instructions to perform one or more processes described in more detail below. The controller may control operations of units, modules, parts, devices, or the like, as described herein. It is also understood that methods below may be executed by an apparatus including a controller in conjunction with one or more other components, as will be appreciated by those skilled in the art.

In addition, the controller of the present disclosure may be implemented as a non-transitory computer-readable recording medium including executable program instructions executed by a processor. Examples of the computer-readable recording medium include ROM, RAM, compact disk (CD) ROM, magnetic tapes, floppy disks, flash drives, smart cards, and optical data storage devices, but are not limited thereto. The computer-readable recording medium may also be distributed throughout a computer network so that the program instructions may be stored and executed in a distributed manner, for example, on a telematics server or a controller Area Network (CAN).

Hereinafter, an exemplary embodiment of the present disclosure will be described in detail with reference to the accompanying drawings.

FIG. 1 is a block diagram of an electronic stability control system for a vehicle according to an embodiment of the present disclosure.

As illustrated in FIG. 1, an electronic stability control system for a vehicle according to an embodiment of the present disclosure includes first, second, third, and fourth acceleration sensors 10, 20, 30, and 40, a controller 50, an actuator 60. Although the electronic stability control system is an example of a four-wheeled vehicle, the vehicle to which the electronic stability control system may be applied are not limited to the four-wheeled vehicle.

The first, second, third, and fourth acceleration sensors 10, 20, 30, and 40 are each mounted on one of the four wheels of the vehicle and measure lateral acceleration (acceleration in a width direction of the vehicle) and vertical acceleration (acceleration in a height direction of the vehicle) of the corresponding wheel. For example, the first acceleration sensor 10 is mounted on a left front wheel and measures lateral acceleration $A_{yfl}$ and vertical acceleration $A_{zfl}$ of the left front wheel, and the second acceleration sensor 20 is mounted on a right front wheel and measures lateral acceleration $A_{yfr}$ and vertical acceleration $A_{zfr}$ of the right front wheel. Similarly, the third acceleration sensor 30 is mounted on a left rear wheel and measures lateral acceleration $A_{yrl}$ and vertical acceleration $A_{zrl}$ of the left rear wheel, and the fourth acceleration sensor 40 is mounted on a right rear wheel and measures lateral acceleration $A_{yrr}$ and vertical acceleration $A_{zrr}$ of the right rear wheel. The first, second, third, and fourth acceleration sensors 10, 20, 30, and 40 transmit the measured lateral acceleration and vertical acceleration of the corresponding wheel to the controller 50.

The controller 50 is configured to receive the lateral acceleration $A_{yfl}$ and vertical acceleration $A_{zfl}$ of the left front wheel, the lateral acceleration $A_{yfr}$ and vertical acceleration $A_{zfr}$ of the right front wheel, the lateral acceleration $A_{yrl}$ and vertical acceleration $A_{zrl}$ of the left rear wheel, and the lateral acceleration $A_{yrr}$ and vertical acceleration $A_{zrr}$ of the right rear wheel from the first, second, third, and fourth acceleration sensors 10, 20, 30, and 40 and calculate maximum values $A_{yf\_max}$ and $A_{yr\_max}$ of lateral angular velocities of the front and rear wheels and lateral tire stiffness Kim and Kim of the front and rear wheels considering load movement. More specifically, the controller 50 compares the lateral acceleration $A_{yfl}$ of the left front wheel with the lateral acceleration $A_{yfr}$ of the right front wheel to calculate the maximum value $A_{yr\_max}$ of the lateral acceleration of the front wheel and compares the lateral acceleration $A_{yrl}$ of the left rear wheel with the lateral acceleration $A_{yrr}$ of the right rear wheel to calculate the maximum value $A_{yr\_max}$ of the lateral acceleration of the rear wheel. In addition, a graph illustrating cornering force under a vertical load in FIG. 3, a graph illustrating cornering power according to load movement in FIG. 4, and the lateral tire stiffness $K_{fm}$ and $K_{rm}$ of the front and rear wheels considering the load movement based on the following Equation (1) is calculated.

$$K_{fm} = \frac{K_f}{|A_{zfl} - A_{zfr}|}, K_{rm} = \frac{K_r}{|A_{zrl} - A_{zrr}|} \quad (1)$$

Figure 3:
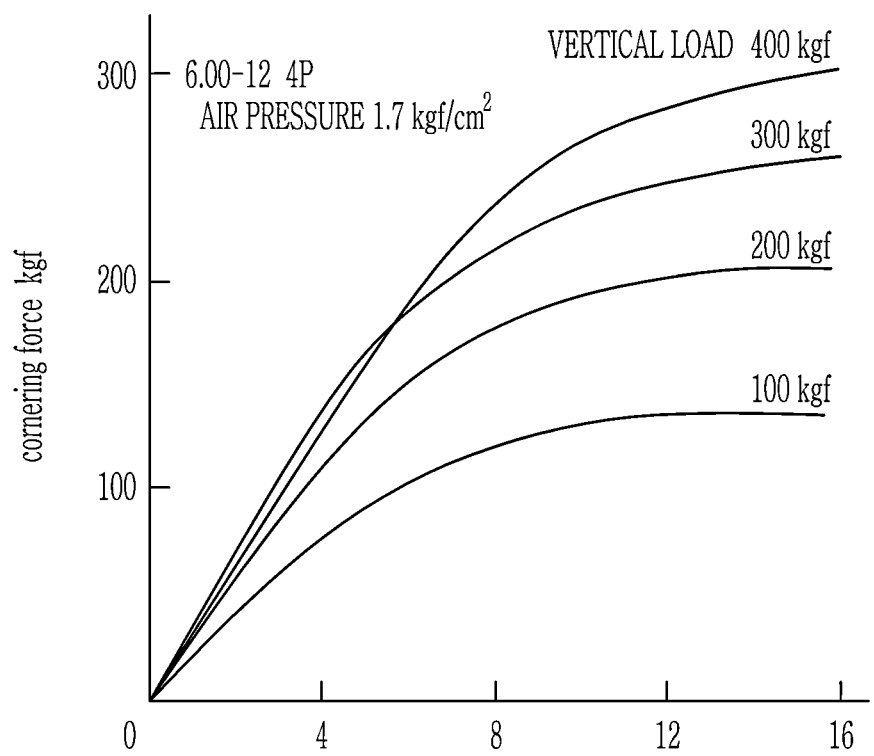
FIG. 3 is a graph illustrating cornering force under vertical load.
Figure 4:
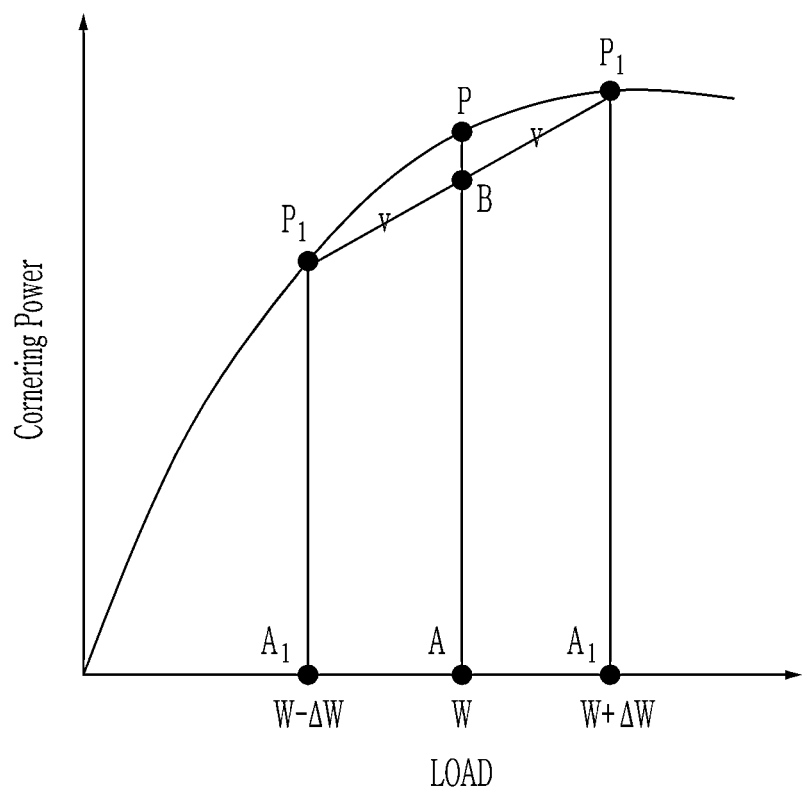
FIG. 4 is a graph illustrating cornering power according to load movement.

Here, $K_f$ and $K_r$ mean the lateral tire stiffness of the front and rear wheels and are a slope of a straight section in FIG. 3. The lateral tire stiffness of the front and rear wheels is a preset value depending on vehicle specifications, wheel specifications, and a vehicle weight. When a vehicle turns, the vehicle is pulled to one side to move the load of the left and right wheels and reduce cornering power due to the load movement as illustrated in FIG. 4. Based on this fact, the lateral tire stiffness $K_{fm}$ and $K_{rm}$ of the front and rear considering the load movement are defined as the above Equation (1).

The controller 50 is configured to determine side slip angles $\beta_f$ and $\beta_r$ of the front and rear wheels from the following Equation (2) based on the maximum values $A_{yf\_max}$ and $A_{yr\_max}$ of the lateral angular velocity of the front and rear wheels and the lateral tire stiffness of the front and rear wheels $K_{fm}$ and $K_{rm}$ considering the load movement.

$$\beta_f = \frac{A_{yf\_max} m_f}{K_{fm}}, \beta_r = \frac{A_{yr\_max} m_r}{K_{rm}} \quad (2)$$

Here, $m_f$ is a mass of the front wheel, and $m_r$ is a mass of the rear wheel.

The controller 50 is configured to calculate a difference ($|\beta_f-\beta_r|$) between the side slip angles of the front and rear wheels and determine whether the calculated difference ($|\beta_f-\beta_r|$) between the side slip angles of the front and rear wheels exceeds a set value. For example, the set value may be 2, but is not limited thereto.

The controller 50 is configured to calculate brake pressure by multiplying the difference ($|\beta_f-\beta_r|$) between the side slip angles of the front and rear wheels by a preset gain when the difference ($|\beta_f-\beta_r|$) between the side slip angles of the front and rear wheels exceeds the set value. In addition, the controller 50 is configured to determine a sign of a value obtained by subtracting the side slip angle of the rear wheel from the side slip angle of the front wheel to determine the wheel to which the brake pressure is to be applied.

The controller 50 transmits a control signal to the actuator 60 so that target brake pressure is applied to the target wheel. The control signal may include the target wheel and the target brake pressure.

For this purpose, the controller 50 is equipped with one or more microprocessors, and the one or more microprocessors may be programmed to perform each step of an electronic stability control method for a vehicle according to an embodiment of the present disclosure.

The actuator 60 is configured to receive a control signal from the controller, form the target brake pressure, and apply the formed target brake pressure to the target wheel. For example, when it is determined to be understeer, the controller 50 applies the target brake pressure to inner front and rear wheels when driving in a curve, and when it is determined to be oversteer, the controller 50 applies the target brake pressure to outer front and rear wheels when driving in a curve.

Hereinafter, an electronic stability control method for a vehicle according to another embodiment of the present disclosure will be described in detail with reference to FIG. 2.

Figure 2:
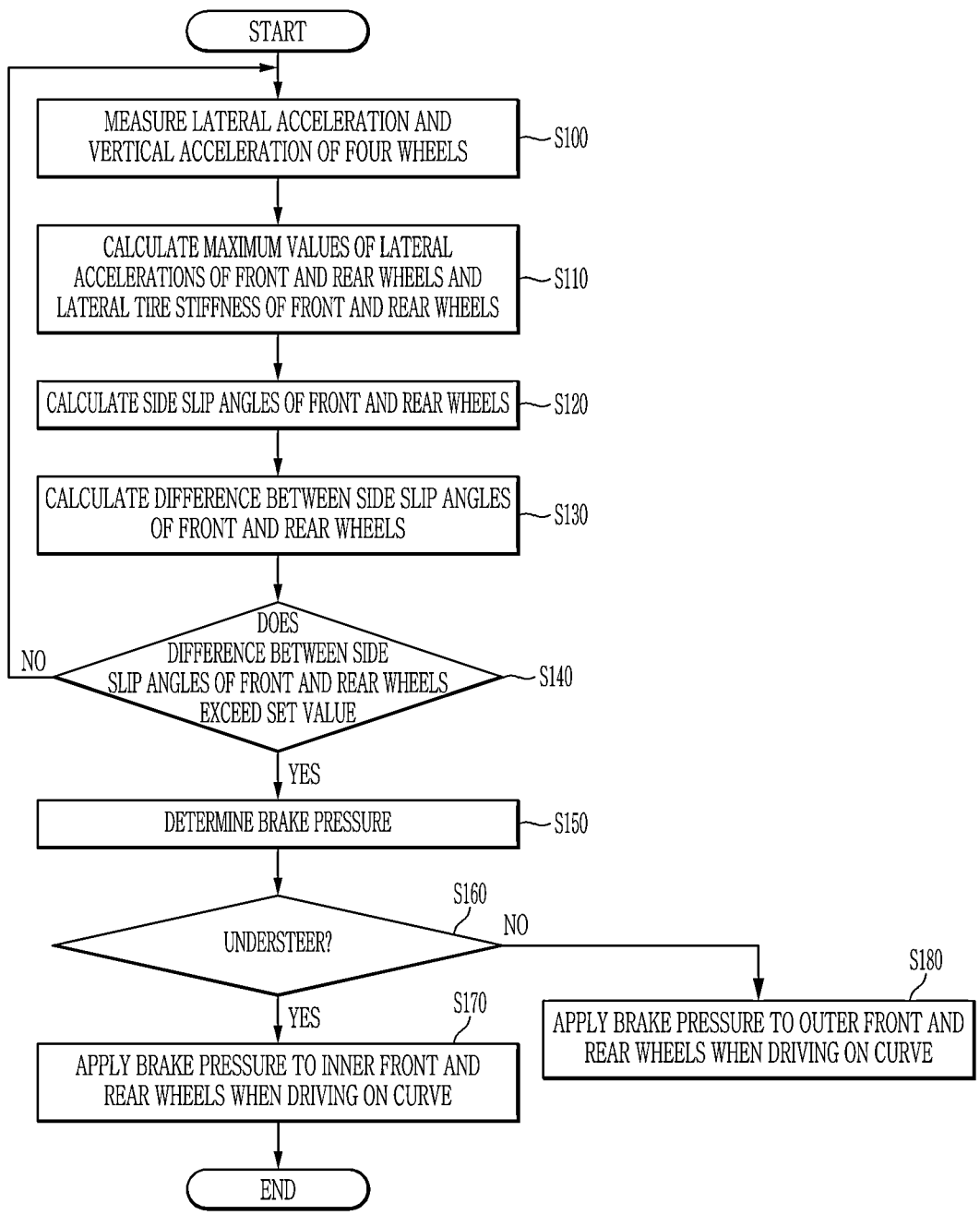
FIG. 2 is a flowchart of an electronic stability control method for a vehicle according to another embodiment of the present disclosure.

FIG. 2 is a flowchart of an electronic stability control method for a vehicle according to another embodiment of the present disclosure.

As illustrated in FIG. 2, the electronic stability control method for a vehicle according to another embodiment of the present disclosure starts by allowing first, second, third, and fourth acceleration sensors 10, 20, 30, and 40 to measure lateral accelerations and vertical accelerations of four wheels of the vehicle begins by measuring acceleration (S100). For example, the first acceleration sensor 10 is mounted on a left front wheel and measures lateral acceleration $A_{yfl}$ and vertical acceleration $A_{zfl}$ of the left front wheel, and the second acceleration sensor 20 is mounted on a right front wheel and measures lateral acceleration $A_{yfr}$ and vertical acceleration $A_{zfr}$ of the right front wheel. Similarly, the third acceleration sensor 30 is mounted on a left rear wheel and measures lateral acceleration $A_{yfr}$ and vertical acceleration $A_{zrl}$ of the left rear wheel, and the fourth acceleration sensor 40 is mounted on a right rear wheel and measures lateral acceleration $A_{yrl}$ and vertical acceleration $A_{zrl}$ of the left rear wheel. The first, second, third, and fourth acceleration sensors 10, 20, 30, and 40 transmit the measured lateral acceleration and vertical acceleration of the corresponding wheel to the controller 50.

When receiving the lateral acceleration $A_{yfl}$ and vertical acceleration $A_{zfl}$ of the left front wheel, the lateral acceleration $A_{yfr}$ and vertical acceleration $A_{zfr}$ of the right front wheel, the lateral acceleration $A_{yrl}$ and vertical acceleration $A_{zrl}$ of the left rear wheel, and the lateral acceleration $A_{yrl}$ and vertical acceleration $A_{zrr}$ of the right rear wheel from the first, second, third, and fourth acceleration sensors 10, 20, 30, and 40, the controller 50 calculates maximum values $A_{yf\_max}$ and $A_{yr\_max}$ of lateral angular velocities of the front and rear wheels and lateral tire stiffness $K_{fm}$ and $K_{rm}$ of the front and rear wheels considering load movement based on the lateral accelerations and vertical accelerations of the four wheels (S110). More specifically, the controller 50 compares the lateral acceleration $A_{yfl}$ of the left front wheel with the lateral acceleration $A_{yfr}$ of the right front wheel to calculate the maximum value $A_{yf\_max}$ of the lateral acceleration of the front wheel, and compares the lateral acceleration $A_{yrl}$ of the left rear wheel with the lateral acceleration $A_{yrr}$ of the right rear wheel to calculate the maximum value $A_{yr\_max}$ of the lateral acceleration of the rear wheel. In addition, the controller 50 calculates the lateral tire stiffness $K_{fm}$ and $K_{rm}$ of the front and rear wheels considering the load movement from the following Equation (1) based on the lateral tire stiffness $K_f$ and $K_r$ of the front and rear wheels, the difference between the vertical accelerations of the left and right front wheels, and the difference between the vertical accelerations of the left and right rear wheels.

$$K_{f_m} = \frac{K_f}{|A_{zfl} - A_{zfr}|}, K_{r_m} = \frac{K_r}{|A_{zrl} - A_{zrr}|} \quad (1)$$

As described above, the lateral tire stiffness of the front and rear wheels is a preset value depending on vehicle specifications, wheel specifications, and a vehicle weight, and the vertical accelerations of the left and right front wheels and the vertical accelerations of the left and right rear wheels are measured by the first, second, third, and fourth acceleration sensors 10, 20, 30, and 40.

When the maximum values $A_{yf\_max}$ and $A_{yr\_max}$ of the lateral angular velocities of the front and rear wheels and the lateral tire stiffness $K_{fm}$ and $K_{rm}$ of the front and rear wheels considering the load movement are calculated, the controller 50 calculates the side slip angles $\beta_f$ and $\beta_r$ of the front and rear wheels from the following Equation (2) based on the maximum values $A_{yf\_max}$ and $A_{yr\_max}$ of the lateral angular velocities of the front and rear wheels and the lateral tire stiffness $K_{fm}$ and $K_{rm}$ of the front and rear wheels considering the load movement (S120).

$$\beta_f = \frac{A_{yf\_max} m_f}{K_{f_m}}, \beta_r = \frac{A_{yr\_max} m_r}{K_{r_m}} \quad (2)$$

Here, $m_f$ is a mass of the front wheel, and $m_r$ is a mass of the rear wheel.

When the side slip angles ($\beta_f$, $\beta_r$) of the front and rear wheels are calculated, the controller 50 calculates a difference ($|\beta_f-\beta_r|$) between the side slip angles of the front and rear wheels (S130), and determines whether the difference ($|\beta_f-\beta_r|$) between the side slip angles of the front and rear wheels exceeds the set value (S140).

When it is determined in step S140 that the difference ($|\beta_f-\beta_r|$) between the side slip angles of the front and rear wheels exceeds the set value, the controller 50 determines that electronic stability control for the vehicle is necessary and determines the brake pressure for braking (S150). For example, the controller 50 calculates the brake pressure by multiplying the difference ($|\beta_f-\beta_r|$) between the side slip angles of the front and rear wheels by a preset gain. When it is determined in step S140 that the difference ($|\beta_f-\beta_r|$) between the side slip angles of the front and rear wheels does not exceed the set value, the controller 50 determines that electronic stability control for the vehicle is not necessary and returns the method to S100.

When the brake pressure is determined, the controller 50 determines a target wheel to be braked. That is, the controller 50 determines to be understeer by determining a sign of a value obtained by subtracting the side slip angle of the rear wheel from the side slip angle of the front wheel (S160).

In step S160, when it is determined to be understeer since the value obtained by subtracting the side slip angle of the rear wheel from the side slip angle of the front wheel is positive (+), the controller 50 controls an actuator 60 to apply the calculated brake pressure to inner front and rear wheels when driving on a curve (S170). Unlike this, in step S160, when it is determined to be oversteer since the value obtained by subtracting the side slip angle of the rear wheel from the side slip angle of the front wheel is negative (−), the controller 50 controls the actuator 60 to apply the calculated brake pressure to outer front and rear wheels when driving on a curve (S180).

Hereinafter, the performance of the electronic stability control method for a vehicle according to another embodiment of the present disclosure will be described in detail with reference to FIGS. 5 to 7.

Figure 5:
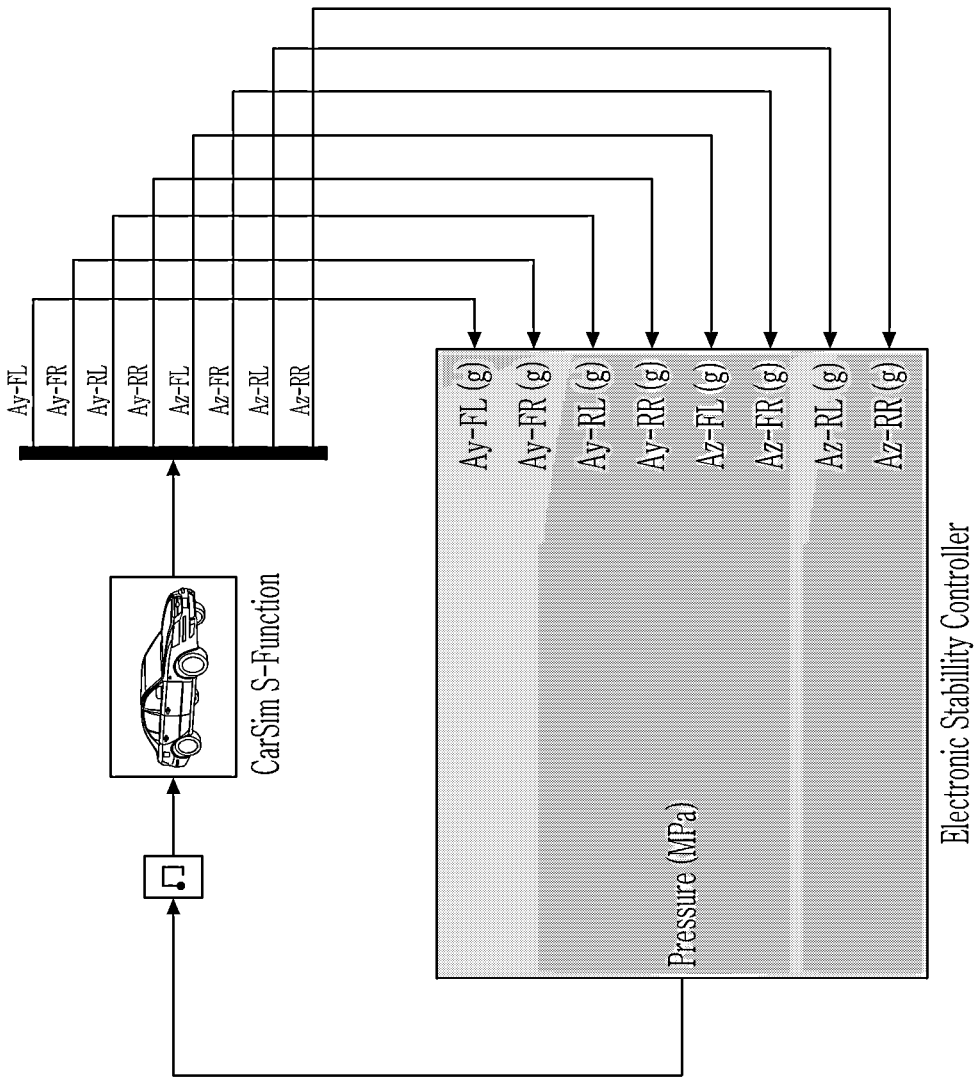
FIG. 5 is a diagram illustrating an example of a vehicle electronic stability control model for evaluating performance of an electronic stability control method for a vehicle according to an embodiment of the present disclosure.
Figure 6:
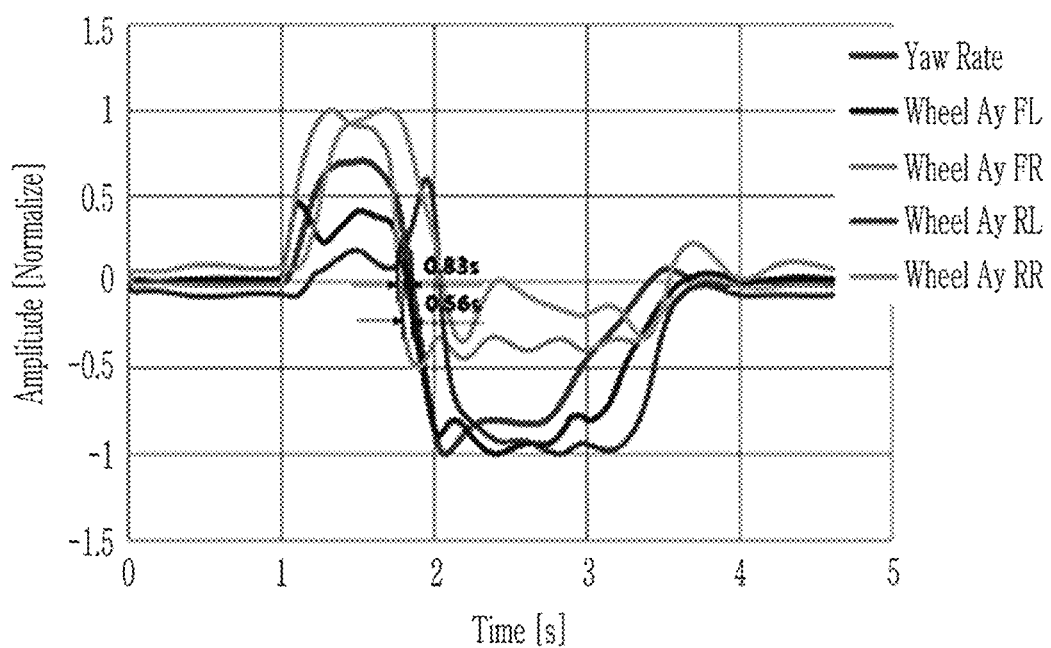
FIG. 6 is a graph illustrating response characteristics of yaw rate and lateral acceleration of the wheel.
Figure 7:
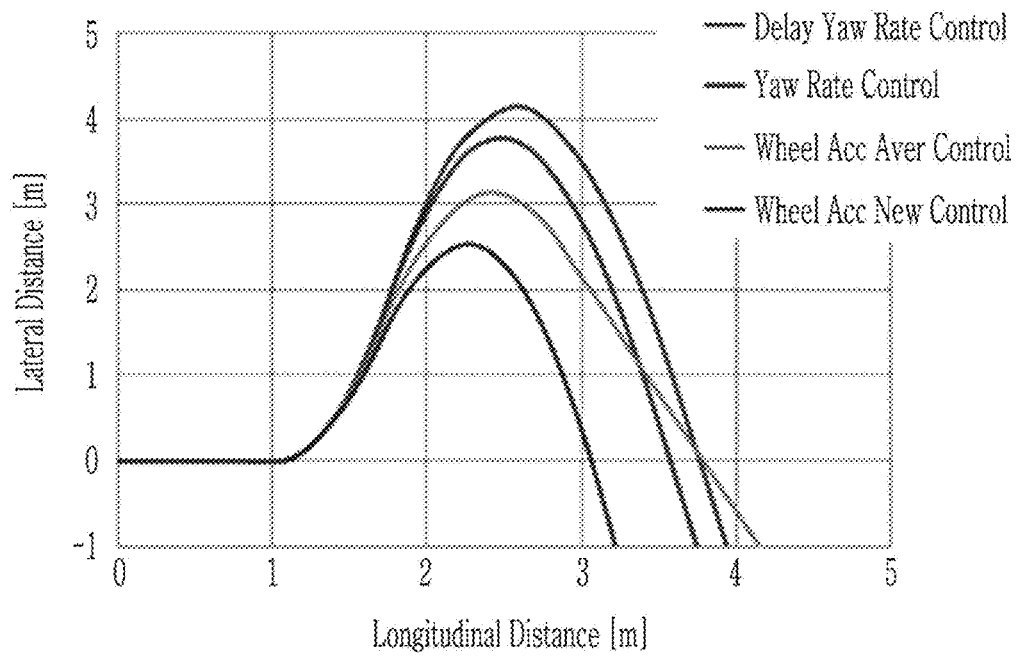
FIG. 7 is a graph illustrating a driving trajectory for a sine with dwell test mode according to control methods.

FIG. 5 is a diagram illustrating an example of a vehicle electronic stability control model for evaluating performance of an electronic stability control method for a vehicle according to an embodiment of the present disclosure, and FIG. 6 is a graph illustrating response characteristics of yaw rate and lateral acceleration of the wheel. FIG. 7 is a graph illustrating a driving trajectory for a sine with dwell test mode according to control methods.

As illustrated in FIG. 5, an algorithm for executing an electronic stability control method for a vehicle according to another embodiment of the present disclosure is stored in a simulation controller, and the first, second, third, and fourth acceleration sensors 10, 20, 30, and 40 are mounted on four wheels of the vehicle. When the lateral accelerations and vertical accelerations of the four wheels are input from the first, second, third, and fourth acceleration sensors 10, 20, 30, and 40 to the simulation controller, the simulation controller calculates a target hydraulic pressure based on the lateral accelerations and vertical accelerations of the four wheels, and transmits a control signal to the actuator 60 so that the actuator 60 applies the target hydraulic pressure to the target wheel.

As a result of the simulation for the sine with dwell test mode, as illustrated in FIG. 6, an average of the and left, and right lateral accelerations of the front wheel shows a response 0.56 seconds faster than the yaw rate, and the maximum values of the left and right lateral accelerations of the front wheel was faster than the yaw rate show a response 0.83 seconds faster than the yaw rate. To determine the effect on the fast response, a driving trajectory for the sine with dwell test mode is compared as illustrated in FIG. 7. As illustrated in FIG. 7, as a result of comparing the electronic stability control for a vehicle according to an embodiment of the present disclosure using the maximum values of the left and right lateral accelerations of the front and rear wheels and the load movement, and average value control of the left and right lateral accelerations of the front and rear wheels, the yaw rate control, and the yaw rate control with a 0.1 second time delay, according to an embodiment of the present disclosure, it may be seen that the electronic stability control for a vehicle moves laterally up to 2.5 m and the average value control of the left and right lateral accelerations of the front and rear wheels moves laterally up to 3.1 m, the existing yaw rate control moves laterally up to 3.8 m, and the yaw rate control with a 0.1 second time delay moves laterally up to 4.1 m. It can be seen that when driving on a road with a lane width of 3 m, the electronic stability control according to an embodiment of the present disclosure allows the vehicle to drive more safely without significantly deviating from the lane. Therefore, the present disclosure may improve the driving stability of the vehicle and reduce accidents caused by the lane departure.

Although preferred embodiments of the present disclosure have been described above, the present disclosure is not limited to the above embodiments, and includes all changes that can be easily made by a person skilled in the art from the embodiments of the present invention and are recognized as equivalent.

What is claimed is:

1. An electronic stability control system for a vehicle, comprising:
   first, second, third, and fourth acceleration sensors, each being mounted on each wheel of the vehicle to detect lateral acceleration and vertical acceleration of the corresponding wheel;
   a controller configured to be connected to the first, second, third, and fourth acceleration sensors to receive the lateral accelerations and the vertical accelerations of the four wheels, calculate maximum values of lateral accelerations of front and rear wheels and lateral tire stiffnesses of the front and rear wheels considering load movement based on the lateral accelerations and the vertical accelerations of the four wheels, calculate side slip angles of the front and rear wheels and a difference between the side slip angles of the front and rear wheels based on the maximum values of the lateral angular velocities of the front and rear wheels and the lateral tire stiffnesses of the front and rear wheels considering the load movement, and determine brake pressure and a target wheel to which the brake pressure is to be applied in response to the difference between the side slip angles of the front and rear wheels exceeding a set value; and
   an actuator configured to receive a control signal from the controller and apply the brake pressure to the target wheel.

2. The electronic stability control system of claim 1, wherein:
   the lateral tire stiffnesses ($K_{fm}$, $K_{rm}$) of the front and rear wheels considering the load movement is calculated from the following Equation $$K_{fm} = \frac{K_f}{|A_{zfl} - A_{zfr}|}, K_{rm} = \frac{K_r}{|A_{zrl} - A_{zrr}|},$$

and
   wherein $K_f$ and $K_r$ are the lateral tire stiffnesses of the front and rear wheels, $A_{zfl}$ and $A_{zfr}$ are the vertical accelerations of the left and right front wheels, and $A_{zrl}$ and $A_{zrr}$ are the vertical accelerations of the left and right rear wheels.

3. The electronic stability control system of claim 1, wherein:
   the side slip angles of the front and rear wheels ($\beta_f$, and $\beta_r$) are calculated from the following Equation $$\beta_f = \frac{A_{yf\_max} m_f}{K_{fm}}, \beta_r = \frac{A_{yr\_max} m_r}{K_{rm}},$$

and
   wherein $m_f$ is a mass of the front wheel, and $m_r$ is a mass of the rear wheel.

4. The electronic stability control system of claim 1, wherein:
   the target wheel is determined according to a sign of a value obtained by subtracting the rear wheel side slip angle from the front wheel side slip angle.

5. The electronic stability control system of claim 4, wherein:
   when the value obtained by subtracting the rear wheel side slip angle from the front wheel side slip angle is positive (+), the target wheel is inner front and rear wheels when driving on a curve, and when the value obtained by subtracting the rear wheel side slip angle from the front wheel side slip angle is negative (−), the target wheel is outer front and rear wheels when driving on the curve.

6. The electronic stability control system of claim 1, wherein:
   the target pressure is calculated by multiplying the difference between the side slip angles of the front and rear wheels by a preset gain.

7. An electronic stability control method for a vehicle, comprising
   detecting, by first, second, third, and fourth acceleration sensors, lateral accelerations and vertical accelerations of four wheels;
   calculating, by a controller, maximum values of lateral accelerations of front and rear wheels and lateral tire stiffnesses of the front and rear wheels considering load movement, based on the lateral accelerations and the vertical accelerations of the four wheels;
   calculating, by the controller, side slip angles of the front and rear wheels and a difference between the side slip angles of the front and rear wheels based on the maximum values of the lateral angular velocities of the front and rear wheels and the lateral tire stiffnesses of the front and rear wheels considering the load movement;

determining, by the controller, brake pressure and a target wheel to which the brake pressure is to be applied in response to the difference between the side slip angles of the front and rear wheels exceeding a set value; and generating, by an actuator, the brake pressure and applying the brake pressure to the target wheel.

8. The electronic stability control method of claim 7, wherein:

the lateral tire stiffnesses ($K_{fm}$, $K_{rm}$) of the front and rear wheels considering the load movement is calculated from the following Equation $$K_{f_m} = \frac{K_f}{|A_{zfl} - A_{zfr}|}, K_{r_m} = \frac{K_r}{|A_{zrl} - A_{zrr}|}$$

and wherein $K_f$ and $K_r$ are the lateral tire stiffnesses of the front and rear wheels, $A_{zfl}$ and $A_{zfr}$ are the vertical accelerations of the left and right front wheels, and $A_{zrl}$ and $A_{zrr}$ are the vertical accelerations of the left and right rear wheels.

9. The electronic stability control method of claim 7, wherein:

the front and rear wheel side slip angles ($\beta_f$, $\beta_r$) are calculated from the following Equation $$\beta_f = \frac{A_{yf\_max} m_f}{K_{f_m}}, \beta_r = \frac{A_{yr\_max} m_r}{K_{r_m}},$$

and wherein $m_f$ is a mass of the front wheel, and $m_r$ is a mass of the rear wheel.

10. The electronic stability control method of claim 7, wherein:

the target wheel is determined according to a sign of a value obtained by subtracting the rear wheel side slip angle from the front wheel side slip angle.

11. The electronic stability control method of claim 10, wherein:

when the value obtained by subtracting the rear wheel side slip angle from the front wheel side slip angle is positive (+), the target wheel is inner front and rear wheels when driving on a curve, and when the value obtained by subtracting the rear wheel side slip angle from the front wheel side slip angle is negative (−), the target wheel is outer front and rear wheels when driving on the curve driving.

12. The electronic stability control method of claim 7, wherein:

the target pressure is calculated by multiplying the difference between the front and rear wheel side slip angles by a preset gain.

* * * * *